United States Patent [19]
Little

[11] Patent Number: 5,768,009
[45] Date of Patent: Jun. 16, 1998

[54] LIGHT VALVE TARGET COMPRISING ELECTROSTATICALLY-REPELLED MICRO-MIRRORS

[75] Inventor: Michael J. Little, Woodland Hills, Calif.

[73] Assignee: E-Beam, Westlake Village, Calif.

[21] Appl. No.: 844,248

[22] Filed: Apr. 18, 1997

[51] Int. Cl.⁶ .................................................. G02B 26/00
[52] U.S. Cl. ...................... 359/293; 359/290; 359/291; 359/295; 359/846; 348/770; 348/771
[58] Field of Search ........................ 359/290, 291, 359/293, 295, 223, 230, 846; 348/770, 771

[56] References Cited

U.S. PATENT DOCUMENTS

| | | | |
|---|---|---|---|
| 3,517,126 | 6/1970 | Yamada et al. | 359/293 |
| 3,746,911 | 7/1973 | Nathanson et al. | 348/771 |
| 3,886,310 | 5/1975 | Guldberg et al. | 348/771 |
| 3,896,338 | 7/1975 | Nathanson et al. | 348/771 |
| 4,710,732 | 12/1987 | Hornbeck | 359/291 |
| 4,786,149 | 11/1988 | Hoenig et al. | 359/290 |
| 4,805,038 | 2/1989 | Seligson | 359/290 |
| 5,172,262 | 12/1992 | Hornbeck | 359/223 |
| 5,287,215 | 2/1994 | Warde et al. | 359/293 |

*Primary Examiner*—Loha Ben
*Attorney, Agent, or Firm*—Elliott N. Kramsky

[57] ABSTRACT

A high intensity image projection system includes a micro-mirror light valve target with micro-mirror elements repulsively pivotally-actuable. Each micro-mirror of the target array comprises a fixed base electrode joined to an overlying micro-mirror element by means of a hinge with each element formed of conductive material. As such, in operation, charge deposited upon either the base electrode or the micro-mirror element is free to migrate, in response to repulsive forces between deposited charges, to the element spaced therefrom. The resulting presence of like charge distributions upon the base electrode and micro-mirror element of a micro-mirror produces a repulsive electrostatic force for pivotally deflecting the micro-mirror element by an amount proportional to the charge deposited thereon. Capacitive charge storage elements and resistive paths are provided for storing and draining the deposited charge between applications of video frame information. In one embodiment, an array of micro-mirror light valves is formed directly upon the face plate of a vidicon tube. In another, a foil is formed that is mounted within the tube by a surrounding clip. In a third embodiment, charge is delivered through a matrix of transistors.

16 Claims, 8 Drawing Sheets

LIGHT VALVE TARGET COMPRISING ELECTROSTATICALLY-REPELLED MICRO-MIRRORS

FIELD OF THE INVENTION

The present invention relates to light valve targets comprising dense arrays of electrostatically deflectable mirrors. More particularly, the invention pertains to targets for light valves comprising micro-mirrors arranged to be repelled from associated electrodes when electrostatically actuated by an electrical signal.

BACKGROUND OF THE PRIOR ART

A cantilever beam deformable mirror target is a micromechanical array of deformable mirrors, each mounted as a cantilever beam, that can be electrostatically and individually deformed by an address means to modulate incident light in a linear or areal pattern. Used in conjunction with projection optics, a cantilever beam deformable mirror target can be employed for displays, optical information processing and electrophotographic printing. An early version employing metal cantilever beams fabricated on glass by vacuum evaporation is taught in U.S. Pat. No. 3,600,798. Another cantilever beam deformable mirrored device is described in an article by R. Thomas et al., "The Mirror-Matrix Tube: A Novel Light Valve For Projection Displays," ED-22 IEEE Tran. Elect. Dev. 765 (1975) and in U.S. Pat. Nos. 3,886,310 and 3,896,338. The device is fabricated by growing a thermal silicon dioxide layer on a silicon-on-sapphire substrate. The oxide is patterned in a cloverleaf array of four centrally-joined cantilever beams. The silicon is isotopically wet-etched until the oxide is undercut, leaving four oxide cantilever beams within each pixel supported by a central silicon support post. The cloverleaf array is then metallized with aluminum for reflectivity. The aluminum deposited on the sapphire substrate forms a reference grid electrode that is held at a d.c. bias. The device is addressed by a scanning electron beam that deposits a charge pattern on the cloverleaf beams, causing the beams to be deformed toward the reference grid by electrostatic attraction. Erasure is achieved by negatively biasing a closely-spaced external grid and flooding the device with low-energy electrons. A schlieren projector is used to convert the beam deflection caused by the deformation of the cantilevers into brightness variations at the projection screen. The cloverleaf geometry permits use of a simple cross-shaped schlieren stop to block out the fixed diffraction background signal without attenuation of the modulated diffraction signal.

Arrays of cantilever beam deformable mirrors integrated on silicon with addressing circuitry are also taught by the prior art. Such arrangements eliminate the electron beam addressing and its associated high voltage circuitry and vacuum envelopes. Devices of this type appear, for example, in the article of K. Petersen, "Micromechanical Light Modulator Array Fabricated on Silicon," 31 Appl. Phys. Lett. 521 (1977) and U.S. Pat. No. 4,229,732. The former reference describes a 16-by-1 array of diving board-shaped cantilever beams. The latter reference describes devices of different architecture, in which the cantilever beams are of square flap shape hinged at a corner. The flaps form a two-dimensional array rather than a one-dimensional row of diving boards with the wells beneath the flaps separated to permit addressing lines to be formed on the top surface of the silicon between the rows and columns of flaps. (The corner hinging of the flaps derives from the cloverleaf architecture taught by U.S. Pat. Nos. 3,886,310 and 3,896,338. The full cloverleaf architecture is not employed as this would preclude surface addressing lines since the cloverleaf flaps are hinged to a central post isolated from the silicon surface.)

A variation of the cantilever beam approach appears in the articles of K. Petersen, "Silicon Torsional Scanning Mirror," 24 IBM J. Res. Dev. 631 (1980) and M. Cadman et al., "New Micromechanical Display Using Thin Metallic Films," 4 IEEE Elec. Dev. Lett. 3 (1983). In this approach, metal flaps are formed that are connected to the surrounding reflective surface at two opposed corners. They operate by twisting the flaps along the axes formed by the connections. The flaps are not formed monolithicly with the underlying addressing substrate. Rather, they are glued to it in a manner analogous to deformable membrane devices.

The drawbacks of the cantilever beam spatial light modulators (SLM) described above include addressing circuitry that limits the fractional active area of the pixels, processing steps that result in low yields, sensitivity to film stress in the beam, beam insulator charging effects, lack of overvoltage protection against beam collapse, performance incompatibilities with low cost optics design and low contrast ratio due to non-planarized addressing circuitry on the surface. Such drawbacks are discussed in U.S. Pat. No. 5,172,262 of Hornbeck covering "Spatial Light Modulator and Method." That patent teaches an electrostatically deflectable beam spatial light modulator with the beam composed of two layers of aluminum alloy and the hinge connecting the beam to the remainder of the alloy formed in only one of the two layers, providing a thick, stiff beam and a thin compliant hinge. The alloy is on a spacer made of photoresist which, in turn, is on a semiconductor substrate. The substrate contains addressing circuitry in a preferred embodiment.

Each of the representative examples of prior art SLM's generally incorporates targets of dense arrays of reflective, electrostatically-deflectable mirrors. Each presents a mirror element structure characterized by a plurality of deflectable, reflective micro-mirrors. Each micro-mirror is spaced-apart from an underlying conductive or metallized electrode by means of an edge hinge or central post of insulative material such as positive photoresist. The insulative post or hinge lies within the only possible path of charge migration between mirror and electrode. As a consequence, potential differences are established between such micro-mirrors and the associated electrodes during operation. This occurs as quantities of charge are deposited upon selected mirrors (e.g. by a scanning electron beam modulated by a video signal input.) The resultant potential differences produce attractive forces that cause the deformable mirrors to deflect toward the associated electrodes.

The limitation of prior art SLM's to light valve targets that feature mirror elements operable exclusively in an attractive deflection mode imposes numerous problems. Many of such problems relate to inherent physical or structural limitations imposed by the size of the neutral air gap between the base electrode and the overlying micro-mirror.

A target comprising an array of micro-mirror elements is conventionally utilized in conjunction with a schlieren optical system. A beam of light is directed to the surface of the array (either directly or through a transparent substrate) which is conventionally addressed by means of a scanning electron beam. Predetermined amounts of charge are selectively deposited upon certain of the micro-mirrors. As mentioned above, the charged micro-mirrors are attracted to underlying base electrodes, each of which is tied to and therefore maintained at the potential of a surrounding grid. The uncharged micro-mirrors of the array remain undeflected and at a neutral attitude, their surfaces parallel to the underlying base electrodes. A 1/60 second scan, for the purpose of depositing charge upon predetermined mirrors of the array, occurs during each video frame while a charge "bleed-off" process takes place between the scanning of video frames.

The schlieren projection system can operate in one of two modes. In a first mode, light rays reflected from neutral micro-mirrors is returned to the optical source while those that are redirected upon reflection from deflected micro-mirrors are reconstituted and focused into a high-intensity image that is projected onto a screen. In an alternative mode, the schlieren optical system may be arranged to employ the light reflected from the neutral micro-mirrors to generate a high-intensity projected image while that reflected from the deflected micro-mirrors is discarded.

In either of the above modes of operation, it is well-known that the potential extent of micro-mirror deflection can significantly affect optical performance. For example, the larger the range of deflection, the larger the range of possible gray-level gradations. Targets formed of arrays of micro-mirrors operating in the attractive mode are strictly limited in this regard as each is subject to a maximum deflection angle that is a function of the height of the hinge joining the base electrode to the micro-mirror. While the maximum angle of deflection is a positive function of hinge height, this simultaneously establishes the size of the air gap between the neutral micro-mirror and its underlying base electrode.

Unfortunately, as hinge height is increased to increase maximum angle of deflection, negative consequences result from the corresponding increase in the size of the neutral air gap. In addition to fabrication problems which tend to limit the maximum height of the hinge, increased gap size increases operating voltage requirements. Such enhanced operating voltage requirements follow from the inverse-square relationship that defines the force fields for attracting the micro-mirrors. By increasing voltage requirements, large air gaps may make it impossible to employ alternative target addressing systems such as transistor matrices. Field effect transistors are typically scaled to tolerate 3.4 to 5 volts. Obviously, a device such as that taught by U.S. Pat. No. 5,172,262, which requires between seven and sixteen volts for micro-mirror deflection, cannot be integrated with a transistor matrix. Thus, the flexibility of application of an attractive-mode target is limited.

As mentioned earlier, attractive-mode devices encounter problems when employed in analog systems to produce gray-level images. It has been found that, when used in an analog deflection mode, an attractive-mode device can usefully employ only about one-third of the physically limited gap due to problems of electrostatic instability. When the attractive voltage reaches a level sufficient to deflect the micro-mirror by more than one-third of the gap, the electrostatic force tends to overwhelm the restoring spring force of the micro-mirror, causing it to snap all the way to the base electrode or close the gap. Physically, it is easy to see that, as the electrostatic attraction force is an inverse square function of separation distance, this force increases significantly as the gap is reduced.

The problem of gray-level operation has been addressed in prior art attractive-mode devices through their operation in a digital, rather than analog, mode. When operated digitally, the full gap height is employed with the micro-mirror allowed to "bottom out" or stop on the base electrode. Gray-level is established through time modulation, created by rapidly switching the micro-mirror between an open and a closed air gap with the proportion determining the shade of the projected image.

A number of problems are encountered when one employs such digital operation. The electronics for driving the light valve target, employing time division multiplexing, is much more complex than that required for analog. Further, the repeated opening and closure of the gap can produce a "sticking" effect due to Vanderwaals forces. Very careful preparation of the surface of the base electrode is required to address this problem, complicating the device and increasing production costs significantly.

SUMMARY OF THE INVENTION

The preceding and other shortcomings of the prior art are addressed by the present invention that provides, in a first aspect, a projection system. Such system includes means for generating a beam of light and directing such light at a target. The target comprises a plurality of electrostatically-actuable micro-mirrors. Such target is arranged to receive the beam.

Means are provided for distributing electrical charge in a predetermined pattern over the target so that predetermined amounts of charge are deposited upon selected micro-mirrors, each of the micro-mirrors including a hinge for joining a micro-mirror element to a base electrode. The micro-mirror element, the electrode and the hinge each comprises electrically-conductive material whereby the micro-mirror element will be electrostatically repelled from the electrode to pivot about the hinge in response to the input of a quantity of electrical charge. Means are also provided for receiving light reflected from the target and generating an image therefrom.

In a second aspect, the invention provides an electro-optical modulator for reflective projection. Such modulator includes a plurality of electrostatically-actuable micro-mirrors. Each micro-mirror includes a hinge for joining a micro-mirror element to a base electrode. The micro-mirror element, the base electrode and the hinge is each of conductive material whereby the micro-mirror element will be electrostatically repelled from the electrode to pivot about the hinge in response to the receipt of a quantity of charge.

In a third aspect, the invention provides an electrostatically-actuable micro-mirror light valve. The light valve includes a base electrode, a reflective micro-mirror element and a hinge for providing edgewise connection between the base electrode and the micro-mirror element whereby the electrode and the element are maintained in pivotal, spaced-apart relation with respect to one another. The micro-mirror element, the electrode and the hinge each comprise electrically-conductive material whereby electrical charge received by the micro-mirror may distribute over the hinge and the base electrode.

The preceding and other features of this invention will become further apparent from the detailed description that follows. Such description is accompanied by a set of drawing figures. Numerals of the drawing figures, corresponding to those of the written description, point to the various features of the invention. Like numerals refer to like features throughout both the written description and the drawing figures.

DETAILED DESCRIPTION OF THE PREFERRED EMBODIMENT

Figure 1:
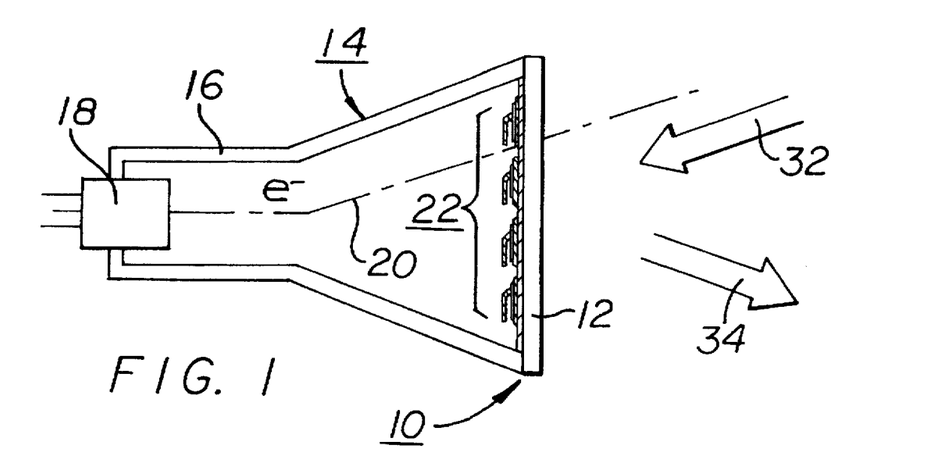
FIG. 1 is a schematic representation of an image amplification and projection system employing a scanning electron gun in combination with a light valve target in accordance with the invention.

Turning to the drawings, FIG. 1 is a schematic representation of an image amplification and projection system employing a scanning electron gun in combination with a light valve target 10 in accordance with the invention. In the embodiment illustrated in FIG. 1, the target 10 is fixed to the face plate 12 of an otherwise-conventional vidicon tube 14.

A glass envelope 16 encloses the tube 14 and is sealably mated to the face plate 12 for maintaining a vacuum therein. An electron gun assembly 18 is situated within and surrounded by a necked-down reduced diameter portion at the rear of the glass envelope 16. The gun assembly 18 is similar to that of a conventional cathode ray tube (CRT) to produce a high resolution scanning electron beam 20 that is directed at a quasi-equipotential surface adjacent the face plate 12. A number of conventional means (not shown) are also located both within and about the glass envelope 16 for performing the functions of (1) scanning the beam 20 in a regular pattern or raster across the face plate 12, (2) modulating the scanning electron beam 20 with an appropriate signal (television or other video) so that beam intensity varies over time and in conjunction with the position of the beam 20 with respect to the surface of the face plate 12 to output a spatially-varying distribution of electron density and (3) focusing the beam within the tube 14. Representative means for accomplishing these functions with a vidicon tube are taught, for example, in U.S. Pat. No. 3,746,911 of Nathanson et al. covering "Electrostatically Deflectable Light Valves for Projection Displays" and U.S. Pat. No. 5,287,215 of Warde et al. covering "Membrane Light Modulation Systems", among others, and the pertinent teachings of such patents are hereby incorporated by reference.

Figure 2:
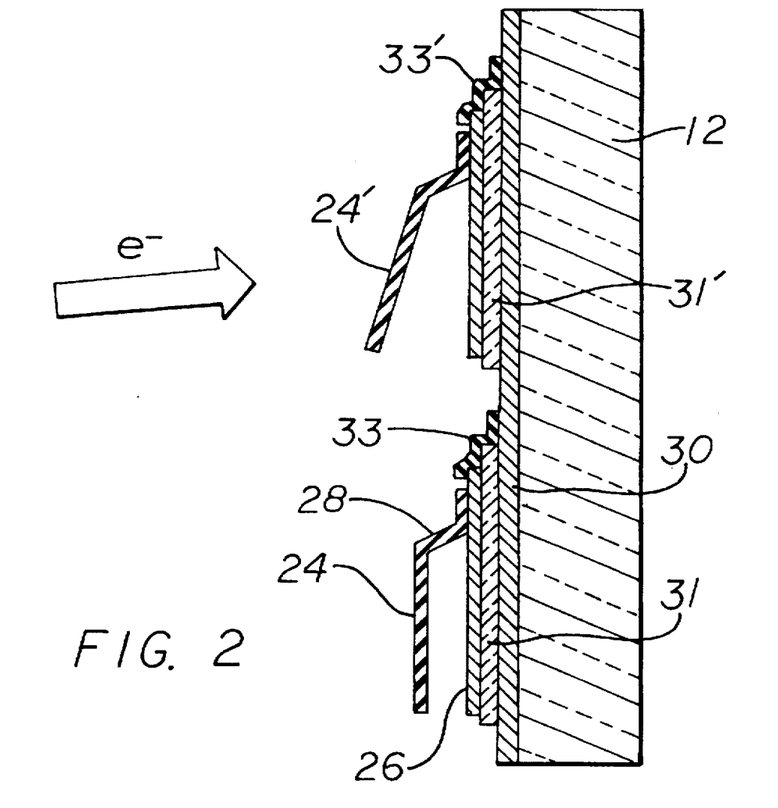
FIG. 2 is an enlarged cross-sectional view of a portion of a target in accordance with the invention for use in the system of FIG. 1.

As mentioned above, the light valve target 10 is fixed to the inner surface of the face plate 12 and comprises a two-dimensional array 22 of light valves. FIG. 2 is an enlarged cross-sectional view of a portion of a micro-mirror in accordance with the invention for use in the system of FIG. 1. Referring to FIG. 1 in combination with FIG. 2, each light valve of the array 22 includes a deflectable micro-mirror element 24 that is joined to an underlying base electrode 26 by means of an inwardly-directed hinge 28. As will be discussed in greater detail below, each of the micro-mirror 24, the hinge 28 and the underlying base electrode 26 is formed of electrically-conductive material for enabling outwardly deflective, rather than inwardly attractive movements of the hinged micro-mirror elements from their neutral positions. This constitutes a primary feature and advantage of the present invention over gap-limited attractive mode devices of the prior art.

A continuous transparent layer of electrically conductive material 30 is formed on the faceplate 12. This electrically conductive layer provides an equipotential surface of voltage V+ at the inner surface of faceplate 12 that acts as the accelerating potential for the electron beam 20 and provides a path for bleeding off the charge accumulated during raster scanning.

A dielectric material 31 and 31', formed on the transparent conductor 30, interposes between the transparent conductor 30 and the micro-mirror's base electrode 26. This conductor-dielectric-conductor sandwich forms a capacitor that stores the charge deposited by the raster scanned electron beam. A resistive material 33 forms an electrically resistive link between the base electrode 26 and the equipotential layer 30. The combination of the capacitance formed by 31 and 31' and the resistance of 33 determines the rate of charge bleed off from the micro-mirror through the familiar equation $\tau=RC$. For a 60 frames per second video signal, the resistance of 33 and the capacitance of 31 would be adjusted to give a discharge time constant, $\tau=10$ m sec. This would insure that substantially all of the deposited charge would be bled off in one frame time.

The light valves of the array 22 are shown greatly enlarged in FIG. 2 with respect to other portions of the tube 14. In practice, a single light valve is positioned at the situs of each pixel of video information over the face plate 12. Thus, for a standard 340 line video raster frame in which each line of video includes 450 pixels, a total of 153,000 micro-mirror light valves is employed. For color applications, three micro-mirror light valves are required per pixel resulting in a total of 459,000 light valves at the inner surface of the face plate 12.

As mentioned, each light valve of the array 22 operates in a repulsive, as opposed to attractive, mode. As electrons are received from the scanning electron beam 20 when it momentarily impinges upon a micro-mirror element of a predetermined light valve, a discrete quantity of charges is deposited. The presence of mutually-repulsive electron forces associated with such charges produces a distribution thereof not only over the surface of the micro-mirror element. Rather, due to the conductive path provided by the electrically-conductive hinge 28, such charge will migrate down the hinge for further distribution over the base electrode 26 of that light valve. A resistive element 33 provides a transmissive path between the base electrode 26 and the +V grid as shown in FIG. 2. Electrons are eventually bled off to the underlying conducting layer 30 through such mutually-contacting resistive elements, "clearing" the micro-mirror element of the target so that all light valves of the target array return to their neutral attitudes. However, electron mobility for distribution throughout a combined micro-mirror light valve structure (less than $10^{-11}$ seconds assuming an approximately 100 micron square micro mirror) vastly exceeds the speed of electron conduction through the adjacent resistive elements (about $10^{-3}$ seconds). As a result, the mutually-repulsive force between a pivoted micro-mirror element and the (fixed) base electrode will persist for a time prior to bleed-off, pivotally deflecting the micro-mirror element from its base electrode.

The selective deflection of micro-mirror elements fixed to the inner surface of the face plate 12 programs the target 10 for modulating an input beam of high intensity light in accordance with the video signal applied to the vidicon tube 14. Input light reflected from the actuated target 10 is thereby optically modulated for subsequent projection of a high intensity optical image through, e.g., a schlieren system.

Conventional optical systems including schlieren elements are taught for example, by U.S. Pat. Nos. 3,746,911 and 3,896,338, and may be employed for projecting the light thus modulated onto a screen or equivalent optical reception device. Such teachings of the aforementioned patents are hereby incorporated by reference. In such systems, a beam of collimated light 32 is incident, through the face plate 12, upon the array 22 of micro-mirror light valves. Light valves of the array 22 whose micro-mirror elements that do not receive a deposit of charge from the scanning electron beam 20 during raster scan remain undeflected and in their neutral positions. The micro-mirror elements of such light valves are substantially parallel to their base electrodes and separated therefrom by the height of the hinges. In contrast, micro-mirror elements receiving some charge during the most recent raster scan are deflected away from the associated base electrodes to different extents in proportion to the amount of charge received and deposited.

Referring to FIG. 1, for those pixel locations for which a micro-mirror element has received no charge and thereby remains at a neutral (no angular displacement) attitude, incident incoming light 32' from the high intensity beam 32 is reflected through the face plate 12 without deviation and is blocked by the schlieren stop from being projected (not shown). In contrast, for those micro-mirror elements that received some quantity of charge, the incident light 32" from the high intensity light source will undergo a degree of angular deviation upon reflection from the deflected micro-mirror element. In the latter case, the output path 34 of the reflected beam through the face plate 12 will differ from that of the incident ray 32'. After deflection, the ray 34 is then directed to the schlieren output optics. Such a schlieren system, as discussed above, is readily capable of transforming the reflected light into optical images whose pixel component intensities are, in each instance, proportional to the degree of deviation experienced upon reflection by light from the high intensity source. Alternatively, schlieren optical systems may be designed to block deviated light rays while transmitting, and generating, optical images based upon the undeviated beams. The design and arrangement of such optical projection systems is well known and understood by those skilled in the art.

FIGS. 3(a) through 3(j) are a series of views for illustrating the fabrication steps of a micro-mirror target 10 in accordance with FIGS. 1 and 2. A transparent glass substrate 36 that will ultimately serve as the face plate 12 of the completed target 10 includes a transparent conductive coating 38 that may comprise, for example, a film of indium-tin oxide (ITO) of approximately 500 Angstrom thickness. In the steps that follow, it will be understood and appreciated that the structures defined occur repetitively over each pixel area of the two-dimensional target.

Figure 3A:
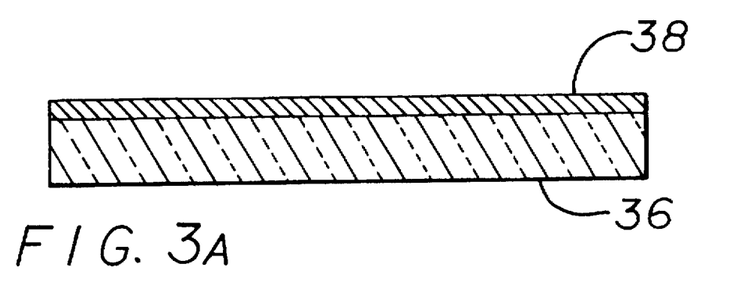
FIGS. 3(a) through 3(i) are a series of views for illustrating the fabrication of a micro-mirror target in accordance with FIGS. 1 and 2.
Figure 3B:
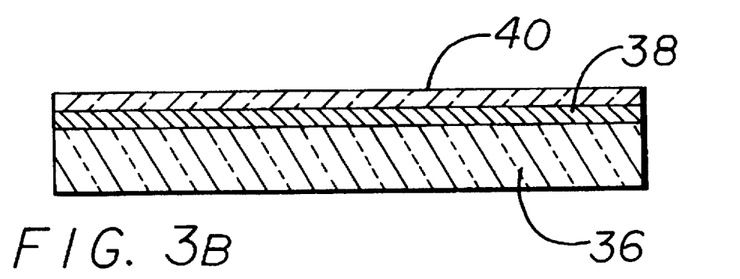
Figure 3C:
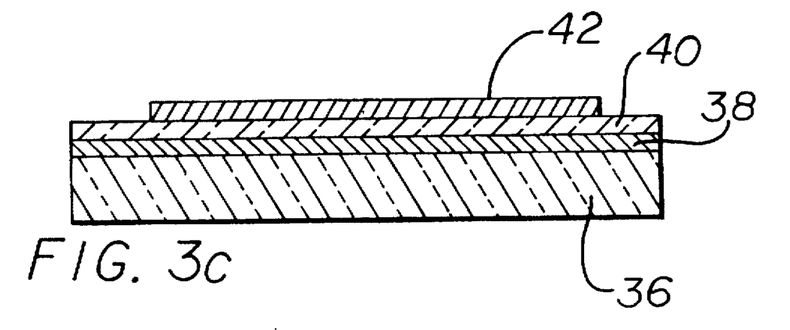
Figure 3D:
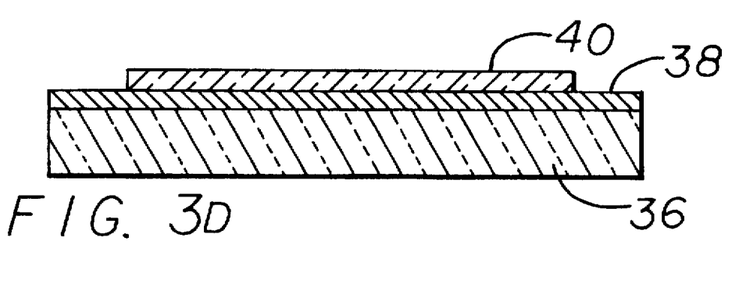

Referring to FIG. 3(b), a layer of dielectric material 40 such as $SiO_2$ having a thickness of, for example, 5000 Angstroms, is deposited upon the transparent conductive coating 38. Photolithography is employed to pattern the dielectric layer 40 and subsequent layers. In FIG. 3(c) a protective layer of photoresist 42 is deposited over a predetermined region of the dielectric layer 40. In FIG. 3(d) one can see the resultant pattern of the dielectric layer 40 after etching and after removal of the layer of photoresist 42.

Figure 3E:
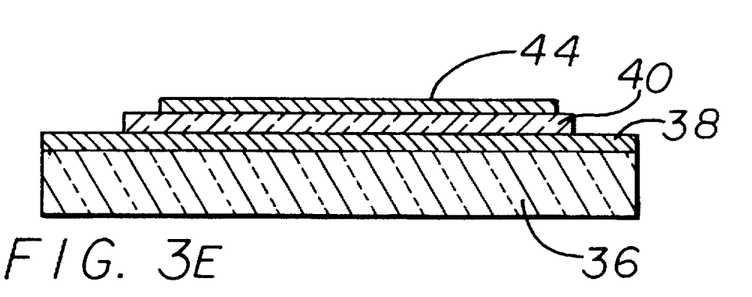

A second layer of transparent conductor 44 (such as ITO of about 500 Angstroms thickness), shaped through photolithography and etching, is added in FIG. 3(e). The combination of transparent conductor 44, dielectric layer 40 and transparent conductive layer 38 defines a capacitor whose capacitance is determined by the thickness and dielectric constant of the dielectric layer 40 as well as the surface areas of the electrodes 38 and 44.

Figure 3F:
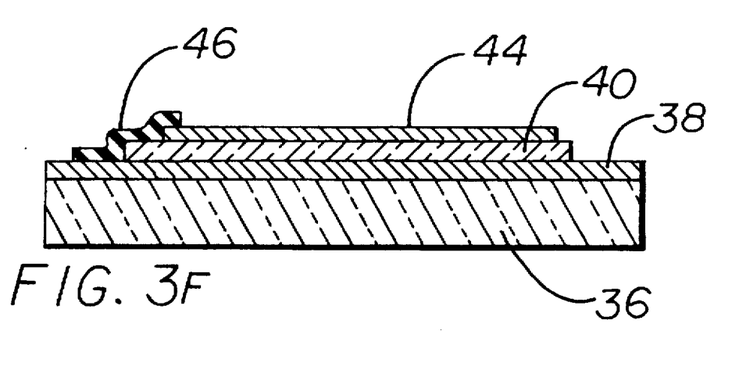

FIG. 3(f) illustrates the resultant structure after deposition of a layer 46 of resistive material (e.g. $SiO_x$ of about 1000 Angstroms thickness) followed by photolithography and etching. The resulting resistive layer 46 provides the resistor in parallel with the capacitor of the RC circuit described above. The resistance of the layer 46 and, thus, the value of the RC time constant), is dependent upon its resistivity, thickness and surface dimensions.

Figure 3G:
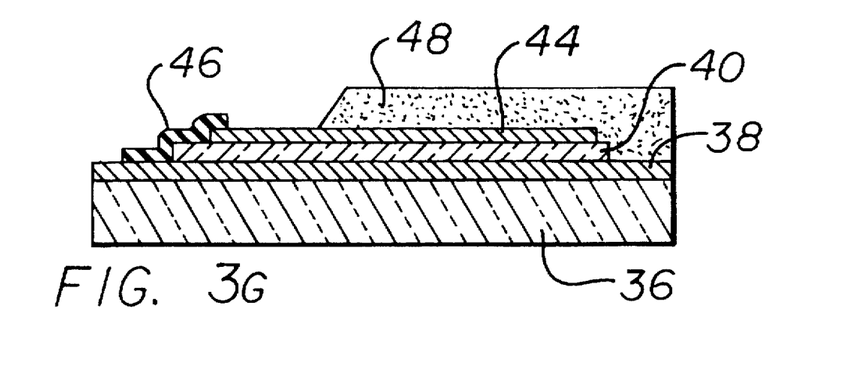

In FIG. 3(g), a sacrificial release layer 48 of photoresist is deposited and patterned upon the existing structure. The layer 48 may be of approximately 1.5 μm in thickness.

Figure 3H:
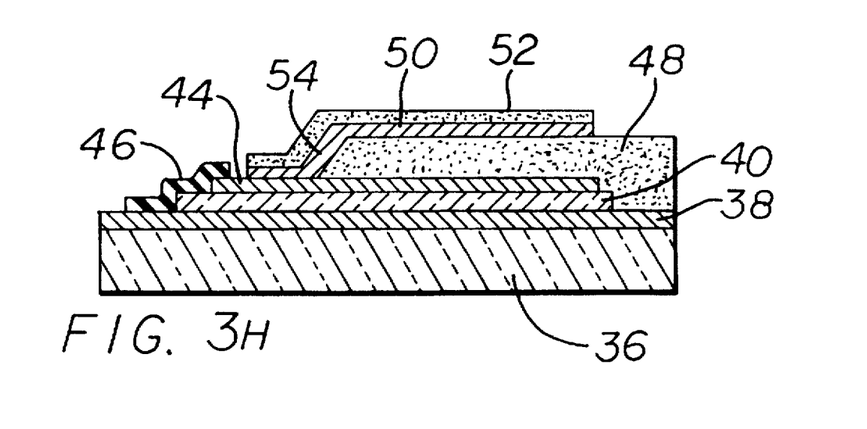

In FIG. 3(h) a layer 50 of material suitable for fabrication of a micro-mirror light valve cantilever (e.g. 1500 Angstrom thick aluminum) is deposited atop the existing structure. A photoresist masking layer 52 is deposited on top of the layer 50 and photolithography and etching are employed to define the appropriate surface shape of the layer 50. As may be observed, a hinge region 54 of the layer 50 is defined where the layer 50 overlies the sloped edge of the underlying sacrificial release layer 48.

It is anticipated that a hinge could be fabricated of material distinct from that of the associated micro-mirror element by introducing an additional deposition and patterning step and reshaping the micro-mirror pattern. This may be desirable in situations where properties of an otherwise-optimum material in terms of reflectivity may possess inadequate or sub-optimal mechanical hinge flexing characteristics.

Figure 3I:
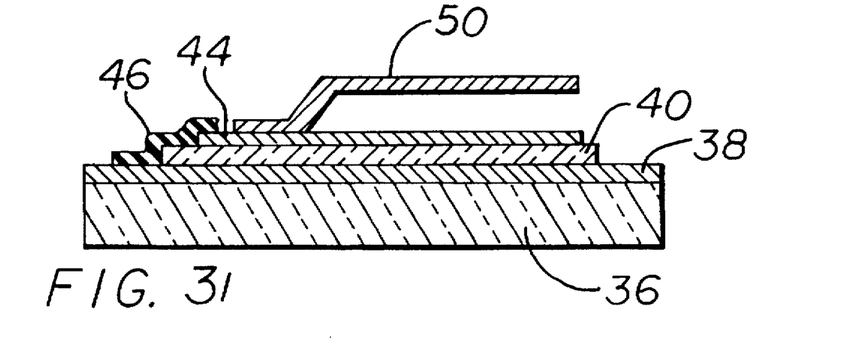

The sacrificial layer 48 is dissolved to release the micro-mirror into a free-standing cantilever beam structure. The resulting completed structure is illustrated in FIG. 3(i).

Figures 4, 5, 6A, 6B:
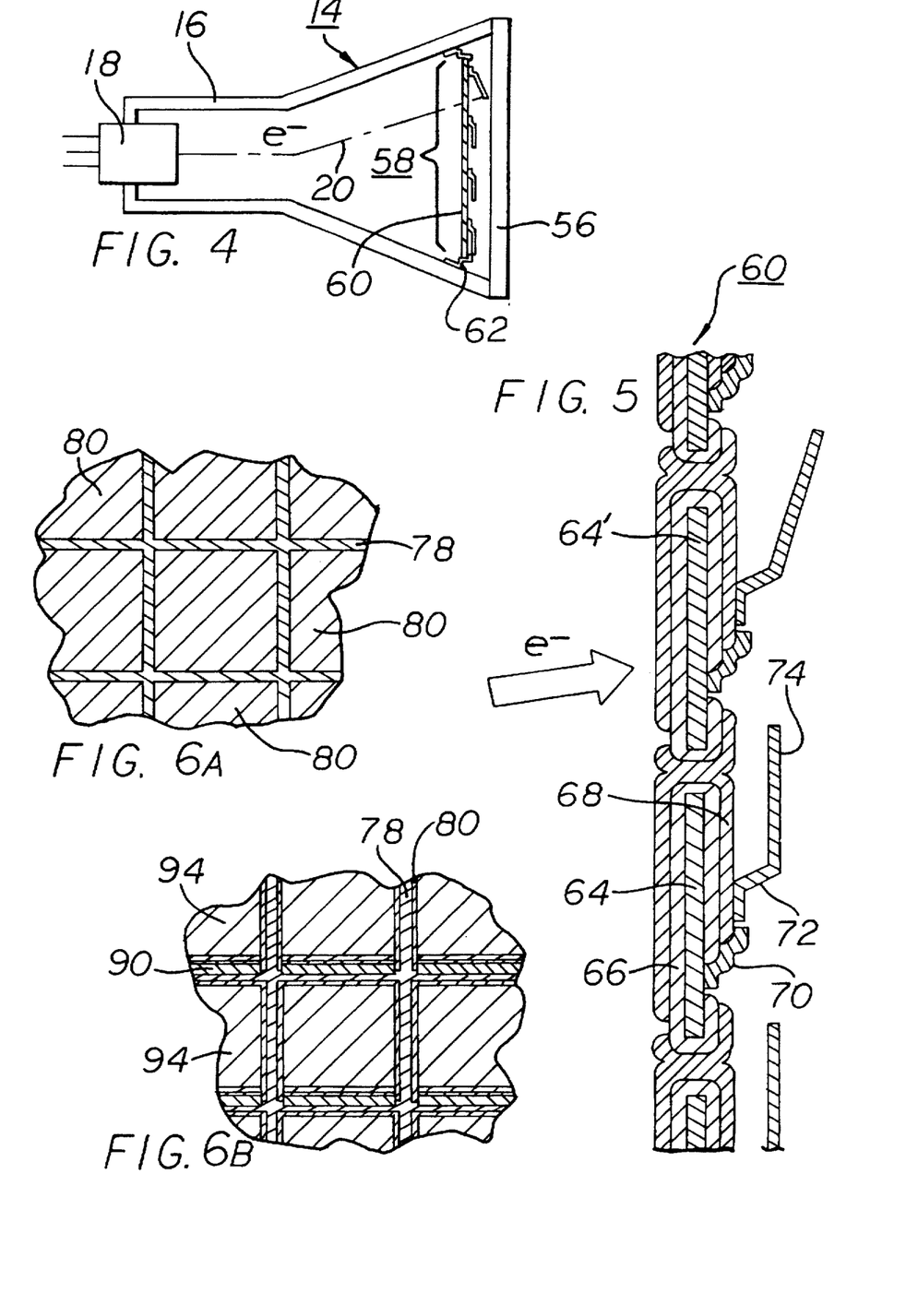
FIG. 4 is a schematic representation of an imaging system employing a scanning electron gun in accordance with an alternative embodiment of the invention.
FIG. 5 is an enlarged cross-sectional view of a portion of a target in accordance with the alternative embodiment of FIG. 4.
FIGS. 6(a) and 6(b) are plan views of the proximate and remote surfaces, respectively, of a target in accordance with the alternative embodiment of FIGS. 4 and 5.

FIG. 4 is a schematic representation of an imaging system employing a scanning electron gun in accordance with an alternative embodiment of the invention. Elements that correspond to those of the system of FIG. 1 are indicated by like figures and require no further introductory discussion. In contrast to the previous embodiment, the face plate 56 of the vidicon tube 14 is separate from, and does not form a portion of, the substrate of the micro-mirror light valve target 58. Rather, the substrate 60 of the target 58 will be seen to comprise a patterned metallic foil that is supported within the glass envelope 16 by means of a surrounding clip 62 of conductive material. An array of micro-mirrors is formed upon the perforated metal foil of the substrate 60 which is in electrical communication with a voltage +V. The substrate 60 comprises a grid that is in resistive communication with the base electrodes of the array of micro-mirrors of the target 58. The micro-mirror elements of the target 58, unlike the prior embodiment, are located at the side of the substrate 60 that faces away from the electron gun 18 and toward the face plate 56. The target 58 is positioned sufficiently distant from the face plate 56 to avoid contact between a fully-deflected micro-mirror element and the interior surface of the face plate 56.

FIG. 5 is an enlarged cross-sectional view of a portion of the target 58. The target 58, as mentioned above, includes a patterned foil substrate 60 comprising, for example, parallel metallic lines 64, 64', of a nominal thickness of about 25 μm. The metal lines 64, 64' intersect with like, orthogonal sets of lines to form a mesh. The mesh-like foil is coated with a layer 66 of dielectric material of about 1 μm nominal thickness. The dielectric layer 66 may be deposited, for example, by immersion coating or electrochemical anodizing. A layer 68 of metal, plated over the dielectric coating layer 66, completes a plurality of capacitor structures, a representative one of which consists of the metal line 64, the layer 66 of dielectric material and the metal layer 68. A resistive element 70 provides electrical connection between the metal layer 68 and the metallic line 64 of the foil substrate 60. It thus resembles and serves the like function of elements 33, 33' of the prior embodiment. That is, a resistive path is provided between the layer 68, serving as micro-mirror base electrode, and the voltage source V+ (through the conductive line 64 of the supporting metal foil). A micro-mirror element 74 is attached to, and is in electrical contact with, the base electrode 68 through a hinge 72.

In operation, the scanning electron beam 20 deposits charge on the proximate surface of the target 58. The electrons impinging upon the metal layer 68 are conductively distributed throughout the metal layer 68, migrating to the remote side of the substrate 60. As before, mutual repulsion between such electrons results in their more-or-less uniform distribution over all contacting metal surfaces. Ultimately, the received charge is distributed through the conductive hinge 72 to the surface of the micro-mirror element 74. The repulsion force created by the mutual presence of electrons on the surfaces of the metallic layer 68 that provides the base electrode of the micro-mirror and the metallic micro-mirror element 74 spaced therefrom is sufficient to deflect the micro-mirror element 80 pivotally about its associated hinge 72 and away from the base electrode layer 68. The amount of force, and the consequent degree of deflection, is proportional to the square of the charge received from the scanning electron beam 20. A schlieren optical system may be employed to translate the deflections of the micro-mirror elements comprising the two-dimensional array of the target 56 into varying gray-levels, enabling analog image projection. Such gray-level capability applies to all embodiments of the invention as, illustrated herein.

Continuing with the description of operation, as the scanning electron beam 20 moves to address the micro-mirror light valve of an adjacent pixel, the charge already deposited upon the base electrode metal layer 68 begins to leak off through the resistive bridge element 70 that joins it conductively to V+ through the line 64 of the mesh-like substrate 60. The resistivity and geometry of the material of the bridge element 70 are such that all deposited charge will have leaked away prior to the next scanning of the micro-mirror by the electron beam 20 (i.e. prior to the next frame). As such, charge is bled from the micro-mirror, the micro-mirror element 74 returns to the neutral or undeflected state (as illustrated in FIG. 5) in response to the restoring spring force exerted by the hinge 72. This, of course, describes essentially the identical process whereby the target employed in the system of FIG. 1 is programmed for operation in conjunction with a high intensity source and optical system to project a high intensity image. Operationally, the main difference between the two embodiments resides in the fact that the charge from the electron gun 18 is initially received at the micro-mirror elements of the array 22 of FIGS. 1 and 2. Conversely, in the embodiment of FIGS. 4 and 5, charge is received directly at the proximate surface of the target 56, with a portion migrating to micro-mirror elements fixed to the opposite, or remote, side.

The essential difference between the above-described embodiments of the micro-mirror light valve targets described above resides in the direction of deflection of the micro-mirror elements of the target when activated. In the first embodiment, the micro-mirror elements deflect in response to repulsive electrostatic forces away from the path of incidents of light from the high intensity light source. In contrast, in the second embodiment, the activated micro-mirror elements deflect toward the path of incidents of such light.

FIGS. 6(a) and 6(b) are proximate and remote surface plan views, respectively, of the target 56 of FIGS. 4 and 5. Reference to this figure will be helpful in a discussion of the process for manufacturing such target. Such process is described in conjunction with FIGS. 7(a) through 7(h) that follow.

Figure 7A:
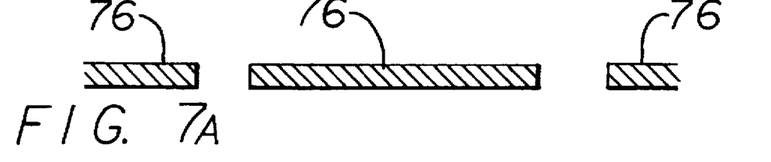
FIGS. 7(a) through 7(h) are a series of views for illustrating a process for forming a target in accordance with the alternative embodiment of the preceding figures.
Figure 7B:
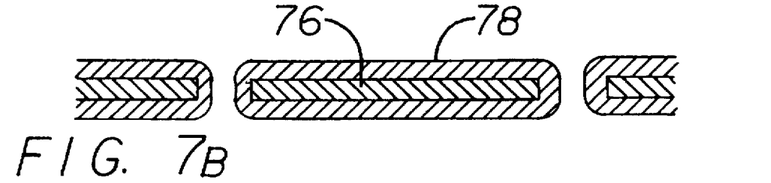
Figure 7C:
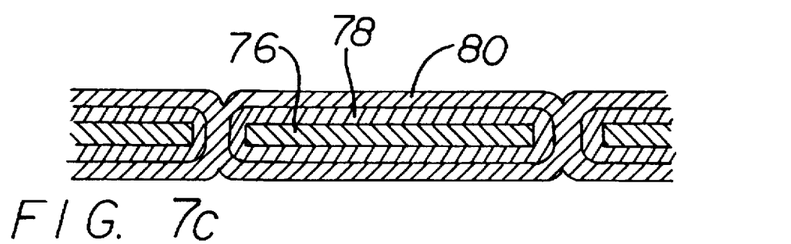

Referring to FIG. 7(a), parallel lines 76 define strips of a metal foil. An orthogonal set of metallic lines intersects therewith, forming a mesh. The foil or mesh lines 76 may be fabricated, for example, of stainless steel, invar, tungsten, molybdenum or the like. In FIG. 7(b), a coating 78 of dielectric material is deposited, encasing the metallic lines 76. In FIG. 7(c) a metal layer 80 is plated on top of the dielectric layer 78, it being noted that the metal layer 80 surrounds the coated lines 76 filling the gaps therebetween.

Figure 7D:
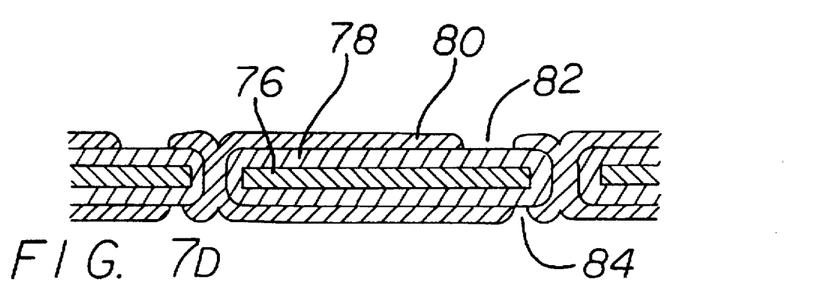

Each combination of a metal line 76, dielectric coating layer 78 and plated metal layer 80 forms a capacitor. FIG. 7(d) illustrates the structure, after photolithographic processing and etching, for defining predetermined regions of the plated metal layer 80. Channels 82 and 84 are defined on the remote and proximate surfaces of the target between remaining regions of the plated metal layer 80.

Figure 7E:
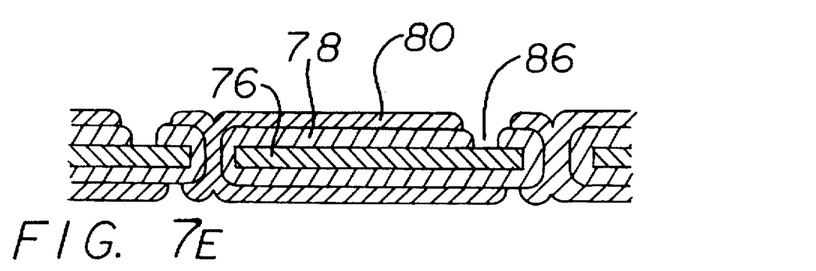
Figure 7F:
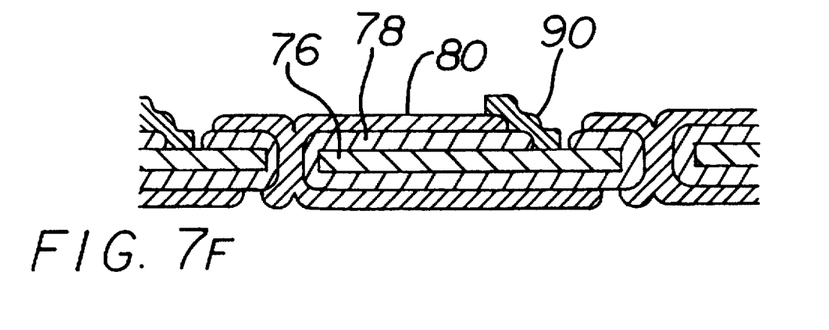

Openings are etched through the metal layer 80 and the dielectric layers 78 to the metallic lines 76 as shown in FIG. 7(e). In FIG. 7(f), a resistive structure 90 of, for example, $SiO_x$, is formed to contact edges of the metal layer 80, the dielectric coating layer 78 and the line 76. The resistive structure 90 provides electrical connection between the base electrode metal layer 80 and the lines of the metal foil 76 or mesh connected to the potential V+.

Figure 7G:
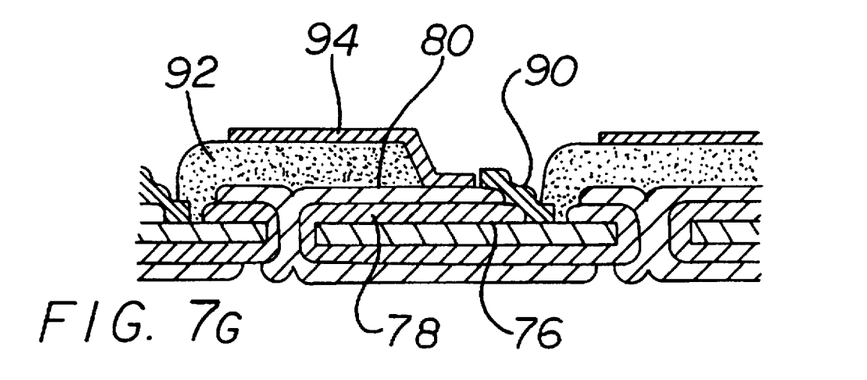
Figure 7H:
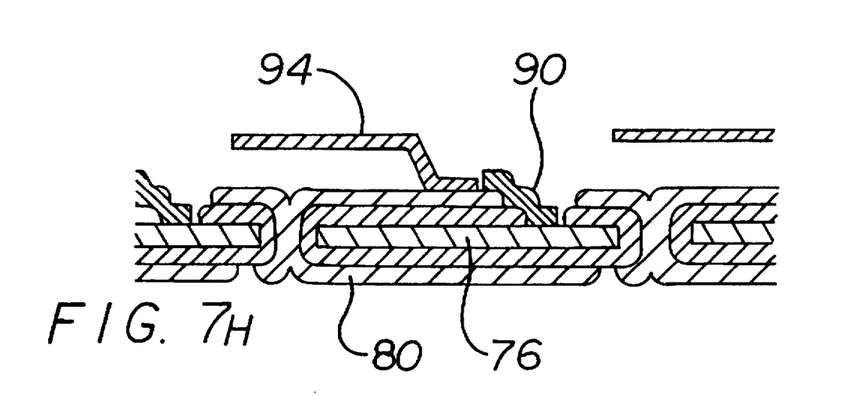

The fabrication of the micro-mirror element and hinge proceed as in the prior embodiment. In FIG. 7(g) one can see that a release layer 92 of photoresist is shaped and a metal layer 94 deposited, patterned and etched thereover. FIG. 7(h) illustrates the completed structure of the alternative embodiment after dissolution of the release layer 92. The micro-mirror element 94 can be seen in FIG. 6(b), a plan view of the remote surface of the target 56.

Figure 8:
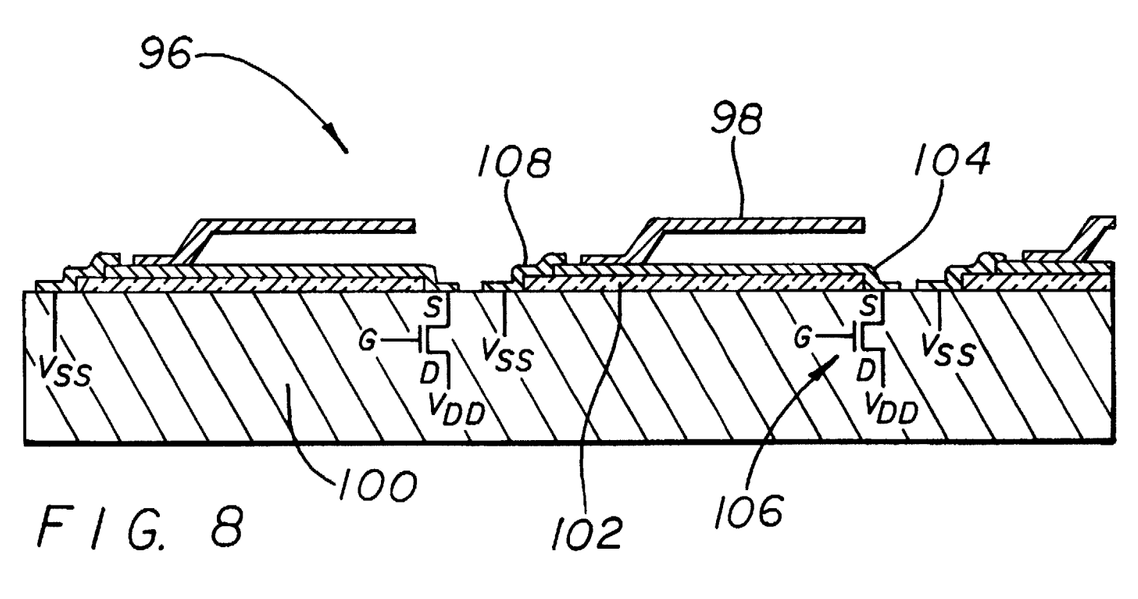
FIG. 8 is an enlarged cross-section of a portion of the target of FIG. 2 in which charge is delivered through a transistor matrix.

FIG. 8 is an enlarged cross-section of a portion of a target 96 arranged for actuation by means of charge received from an underlying transistor matrix. It will be seen from the discussion that follows that the light valve structure of the target 96 resembles that of the target 10 of FIGS. 1 and 2. Operationally, the target 96 also resembles the target 58 of FIGS. 4 and 5 as input electrical charge is received at the base electrodes of the micro-mirrors and charge distribution occurs over the surfaces of the micro-mirrors in the sense of the embodiment of FIGS. 4 and 5.

The matrix comprises an array of transistor drivers 118 for supplying electrical charge for pivotally repelling the micro-mirror elements 98 from the neutral positions illustrated in FIG. 8. The matrix may comprise a device similar to those employed for driving liquid crystal displays. Alternatively, an array of electron emitters may be employed, an arrangement common in field emission displays (FED's). The fabrication and design of such devices and, hence, such a matrix, is well known to those skilled in the art.

The transistor matrix comprising a plurality of drives 118 is fabricated within a substrate 100 in a conventional manner and the micro-mirror array is formed thereon. A single micro-mirror is aligned with each drive transistor (thereby forming a corresponding two-dimensional micro-mirror array) after completion of fabrication of the array of drive transistors 106 within the substrate 100. A dielectric layer is deposited, then preferentially formed through photolithography and etching, to create an array of insulating base electrode support elements 102. Each support element 102 electrically isolates the associated base electrode 104 and forms a capacitor structure to store the signal charge during the interval between addressing (frame time). The fabrication of the micro-mirror target 96 array is performed through a sequence of processing (photoresist, etching, metal deposition, etc.) steps similar to those employed to form the prior embodiments. The necessary modifications to accommodate the somewhat-different structure of FIG. 8 will be well understood by those skilled in the art. The fabrication and operation of the composite structure, including a transistor matrix and overlying array of micro-mirrors operable in an attractive, rather than repulsive, mode is taught in U.S. Pat. No. 5,172,262 and the teachings thereof are hereby incorporated by reference. Generally, in an embodiment as arranged in FIG. 8, charge, defining, for example, a video signal, is input into the two-dimensional array of drive transistors of the substrate 100 through control of the gate voltages of the transistors 106. Digital operation is contemplated as, by controlling the FET's within the substrate 100, either zero voltage or the drain voltage $V_{DD}$ is input to selected micro-mirror drive electrodes 106. The above-described charge distribution and electrostatic repulsion processes occur when $V_{DD}$ is applied. The distributed charge is then bled to ground from the charged FET's through resistive elements 120. Thus a separate grid is not required in the case of a configuration as illustrated in FIG. 8.

It is seen from the preceding that the present invention provides a target comprising a plurality of micro-mirror light valves, each individually addressable and actuable in a repulsive mode. By employing the teachings of the invention one may obtain numerous beneficial results not offered nor equally feasible in devices that operate in an attractive mode. Light valve targets in accordance with the invention are not subject to the diseconomies and restrictions that follow from a range of angular deflection that is limited by the height of the hinge that adjoins base electrode with micro-mirror element.

By utilizing the teachings of the present invention one may realize numerous advantages in terms of both quality and economy. The removal of the gap barrier posed by prior art devices permits wide dynamic range analog operation at voltages that permit electron delivery through both electron gun, transistor matrix or other charge delivery arrangements. Further, the device does not require extensive fine polishing to overcome deleterious surface effects.

While this invention has been described with reference to its presently-preferred embodiments, it is not limited thereto. Rather, this invention is only limited insofar as it is defined by the following set of patent claims and includes within its scope all equivalents thereof.

What is claimed is:

1. A projection system comprising, in combination:
a) means for generating a beam of light and directing said beam at a target;
b) said target comprising a plurality of electrostatically-actuable micro-mirrors and being arranged to receive said beam;
c) means for distributing electrical charge in a predetermined pattern over said target so that predetermined amounts of charge are deposited upon selected micro-mirrors;
d) each of said micro-mirrors including a hinge for joining a micro-mirror element to a base electrode;
e) said micro-mirror element, said base electrode and said hinge each comprising electrically-conductive material whereby said micro-mirror element will be electrostatically repelled from said electrode to pivot about said hinge in response to the input of a quantity of electrical charge from said means for distributing; and
f) means for receiving light reflected from said target and generating a visible image therefrom.

2. A projection system as defined in claim 1 wherein said means for distributing electrical charge comprises a vidicon tube.

3. A projection system as defined in claim 2 further characterized in that said target is formed upon a face plate of said vidicon tube.

4. A projection system as defined in claim 3 wherein:
a) said base electrode is located at an interior surface of said face plate; and
b) said hinge projects from said base electrode toward the interior of said vidicon tube.

5. A projection system as defined in claim 4 further including:
a) a transparent conductive layer fixed to the interior surface of said face plate;
b) a layer of dielectric material located between each of said base electrodes and said transparent conductive layer; and
c) at least one resistive bridge element in electrical connection with and joining said base electrode to said transparent conductive layer.

6. A projection system as defined in claim 2 further comprising:
a) a grid comprising a plurality of intersecting lines of conductive material forming a plurality of grid cells;
b) each of said base electrodes being associated with a cell of said grid;
c) a layer of dielectric material interposed between each base electrode and the conductive, lines of said associated grid cell;
d) a micro-mirror element supported in spaced-apart relationship with respect to each base electrode by a hinge that projects toward a face plate of said tube;
e) a plurality of bridge elements of resistive composition;
f) each of said base electrodes being conductively joined to the associated grid cell by at least one of said bridge elements; and
g) means for mounting said target to the interior of said tube.

7. A projection system as defined in claim 1 wherein:
a) said means for distributing electrical charge comprises a substrate comprising an array of drive transistors; and
b) said plurality of micro-mirrors is arranged into a corresponding array whereby each is associated with a drive transistor.

8. A projection system as defined in claim 7 further including:

a) each of said base electrodes being in electrical contact with said substrate; and b) an insulative layer being interposed between a portion of said base electrode and said substrate.

9. An electro-optical modulator for reflective image projection comprising, in combination:

a) a plurality of electrostatically-actuable micro-mirrors;

b) each of said micro-mirrors including an edge hinge for joining a micro-mirror element to a base electrode; and c) said micro-mirror element, said base electrode and said hinge each comprising electrically-conductive material whereby said micro-mirror element will be electrostatically repelled from said electrode to pivot about said hinge in response to a receipt of a quantity of charge.

10. An electro-optical modulator as defined in claim 9 wherein said plurality of micro-mirrors is fixed to a first surface of a transparent substrate.

11. An electro-optical modulator as defined in claim 10 further including:

a) a transparent conductive layer fixed to said first surface of said substrate;

b) said layer being held at a predetermined potential; and c) means for electrically connecting said micro-mirrors to said layer.

12. An electro-optical modulator as defined in claim 11 further including:

a) a layer of dielectric material interposed between the base electrode of each of said micro-mirrors and said transparent conductive layer; and b) at least one resistive bridge element in electrical connection with each of said base electrodes and said transparent conductive layer.

13. An electro-optical modulator as defined in claim 9 further including:

a) a conductive grid;

b) said grid being held at a predetermined potential and comprising a plurality of intersecting lines of conductive material forming a plurality of grid cells;

c) each of said base electrodes being associated with a cell of said grid;

d) a micro-mirror element supported in spaced-apart relationship with respect to each base electrode by a hinge;

e) a plurality of bridge elements of resistive composition; and f) each of said base electrodes being conductively joined to the lines of the associated grid cell by at least one of said bridge elements.

14. An electro-optical modulator as defined in claim 13 further including a layer of dielectric material interposed between each of said base electrodes and the conductive lines of said associated grid cell.

15. An electrostatically-actuable micro-mirror light valve comprising, in combination:

a) a base electrode;

b) a reflective micro-mirror element;

c) a hinge for connecting said base electrode and said micro-mirror element whereby said electrode and said element are maintained in pivotal spaced-apart relation with respect to one another; and d) said micro-mirror element, said base electrode and said hinge each comprise electrically-conductive material whereby electrical charge received by said micro-mirror distributes over said element, said hinge and said base electrode.

16. An electrostatically-actuable micro-mirror light valve as defined in claim 15 further including:

e) a conductive surface;

f) a layer of dielectric material interposed between said base electrode and said surface; and g) at least one resistive bridge element for providing electrical connection between said base electrode and said conductive surface.

* * * * *